(12) United States Patent
Li et al.

(10) Patent No.: US 12,544,953 B2
(45) Date of Patent: Feb. 10, 2026

(54) UPPER JACKING STRUCTURE, HALF-SLITTING MACHINE AND HALF-SLITTING METHOD

(71) Applicant: FUZHOU SKYWIRETECH CO., LTD., Fuzhou (CN)

(72) Inventors: Haiwei Li, Fuzhou (CN); Bo Li, Fuzhou (CN); Xinghua Liang, Fuzhou (CN); Shubin Fan, Fuzhou (CN); Guangjian Zheng, Fuzhou (CN); Cien Chen, Fuzhou (CN); Wenren Wang, Fuzhou (CN); Zhouchen Lin, Fuzhou (CN); Jinfeng Shen, Fuzhou (CN); Chaojie Chen, Fuzhou (CN); Dejing He, Fuzhou (CN); Wusen Chen, Fuzhou (CN)

(73) Assignee: FUZHOU SKYWIRETECH CO., LTD., Fuzhou (CN)

( * ) Notice: Subject to any disclaimer, the term of this patent is extended or adjusted under 35 U.S.C. 154(b) by 351 days.

(21) Appl. No.: 18/464,450

(22) Filed: Sep. 11, 2023

(65) Prior Publication Data
US 2025/0066169 A1 Feb. 27, 2025

(30) Foreign Application Priority Data

Aug. 24, 2023 (CN) .......................... 202311071878.X

(51) Int. Cl.
*B28D 5/00* (2006.01)
*B26D 7/01* (2006.01)
*B26D 7/04* (2006.01)

(52) U.S. Cl.
CPC .......... *B28D 5/0052* (2013.01); *B28D 5/0041* (2013.01); *B28D 5/0058* (2013.01);
(Continued)

(58) Field of Classification Search
CPC .......... B23Q 1/25; B23Q 1/262; B23Q 3/064; B23Q 3/106–108; B23Q 3/18–186;
(Continued)

(56) References Cited

FOREIGN PATENT DOCUMENTS

CN 113843906 A * 12/2021 ........... B28D 5/0058
CN 116277557 A 6/2023

OTHER PUBLICATIONS

CN113843906. Original Patent and Machine Translation (Year: 2021).*

(Continued)

*Primary Examiner* — Tyrone V Hall, Jr.
(74) *Attorney, Agent, or Firm* — Westbridge IP LLC

(57) ABSTRACT

Disclosed are an upper jacking structure, a half-slitting machine and a half-slitting method. The upper jacking structure includes a lower jacking block, a cutting assembly, a first linear reciprocating device, an upper jacking block and an auxiliary tensioner. The lower jacking block is located below the upper jacking block, a clamping space is formed between the lower jacking block and the upper jacking block, a cutting end of the cutting assembly moves in a vertical direction and a horizontal direction in and out of the clamping space, a movable end of the first linear reciprocating device moves in the vertical direction, and the upper jacking block is provided on the movable end of the first linear reciprocating device; the upper jacking block has a first jacking surface provided with a first jacking head and a second jacking head at either side of a center line of the first jacking surface.

19 Claims, 11 Drawing Sheets

(52) U.S. Cl.
    CPC ...... *B28D 5/0082* (2013.01); *B26D 2007/013* (2013.01); *B26D 7/04* (2013.01)
(58) Field of Classification Search
    CPC ...... B26D 2007/013; B26D 7/14; B26D 7/02; B26D 7/04; B28D 1/227; B28D 1/32; B28D 1/322; B28D 1/327; B28D 5/0041; B28D 5/0052; B28D 5/0058; B28D 5/0082; B28D 5/042; B28D 5/045; B28D 5/04
    See application file for complete search history.

(56)           References Cited

OTHER PUBLICATIONS

First Office Action issued in counterpart Chinese Patent Application No. 202311071878.X, dated Nov. 14, 2025.

\* cited by examiner

UPPER JACKING STRUCTURE, HALF-SLITTING MACHINE AND HALF-SLITTING METHOD

CROSS-REFERENCE TO RELATED APPLICATIONS

This application claims priority to Chinese Patent Application No. 202311071878.X. filed on Aug. 24, 2023, the content of which is incorporated herein by reference in its entirety.

TECHNICAL FIELD

The present application relates to the technical field of silicon rod processing, in particular to an upper jacking structure, a half-slitting machine and a half-slitting method.

BACKGROUND

Silicon crystals are widely used in the field of photovoltaic power generation. In order to meet the quality parameters of silicon crystal rods and the shape and size of the next procedure, preliminary processing of silicon rods is usually required, such as cutting the silicon rods with circular cross-section into silicon rods with square cross-section. However, the current cutting device cannot move a cutting line to a clamping area where the device clamps the silicon rod to perform a half-slitting operation on the silicon rod, i.e., cutting the silicon rod into two silicon rod blanks along a length direction of the silicon rod.

SUMMARY

The technical problem to be solved by the present application is to provide an upper jacking structure, a half-slitting machine and a half-slitting method to enable a half-slitting operation on a silicon rod.

In order to solve the above technical problem, the technical solution adopted by the present application is: an upper jacking structure, a half-slitting machine and a half-slitting method. The upper jacking structure includes a first linear reciprocating device, an upper jacking block and an auxiliary tensioner, a movable end of the first linear reciprocating device moves in a vertical direction, and the upper jacking block is provided on the movable end of the first linear reciprocating device; the upper jacking block has a first jacking surface symmetrically provided with a first jacking head and a second jacking head at either side of a center line of the first jacking surface, and the first jacking head and the second jacking head are slidingly provided on the first jacking surface in a vertical direction; the auxiliary tensioner is located on a side of the upper jacking block adjacent to the first jack, and the auxiliary tensioner has a movable end moving in a vertical direction.

In order to solve the above technical problem, another technical solution adopted by the present application is: a half-slitting machine including a lower jacking block, a cutting assembly. and an upper jacking structure according to the above solution. The lower jacking block is below the upper jacking block, a clamping space is formed between the lower jacking block and the upper jacking block, and a cutting end of the cutting assembly is movable in a vertical direction and a horizontal direction into and out of the clamping space.

A half-slitting method based on the half-slitting machine in the above-mentioned solution includes performing a cutting-feed process and a half-slitting process.

The performing the cutting-feed process includes:

step S1: feeding a silicon rod into the clamping space, where a second jacking head of an upper jacking block abuts against the top surface of the silicon rod, and a movable end of a first jacking head and/or an auxiliary tensioner abuts against the top surface of the silicon rod, and the jacking head of a lower jacking block abuts against the bottom surface of the silicon rod;

step S2-1: performing step S3 if both the first jacking head and the movable end of the auxiliary tensioner abut against the top surface of the silicon rod, and the movable end of the auxiliary tensioner is separated from the top surface of the silicon rod in step S1;

step S2-2: where step S3 is performed if the first jacking head abuts against the top surface of the silicon rod, and the movable end of the auxiliary tensioner maintains a distance from the top surface of the silicon rod in step S1;

step S2-3: the first jacking head first abuts against the top surface of the silicon rod, and then the movable end of the auxiliary tensioner is separated from the top surface of the silicon rod, and then step S3 is performed if the first jacking head maintains a distance from the top surface of the silicon rod, and the movable end of the auxiliary tensioner abuts against the top surface of the silicon rod in step S1;

step S3: making a cutting end of the cutting assembly enter between the auxiliary tensioner and the first jacking head from below the movable end of the auxiliary tensioner;

step S4: abutting the movable end of the auxiliary tensioner against the top surface of the silicon rod;

step S5: separating the first jacking head from the top surface of the silicon rod;

step S6: making the cutting end of the cutting assembly enter between the first jacking head and the second jacking head from below the first jacking head;

step S7: making the movable end of the first jacking head and/or the auxiliary tensioner abut against the top surface of the silicon rod.

The half-slitting process includes step S8: cutting, by the cutting end of the cutting assembly, from the top end of the silicon rod to the bottom end of the silicon rod until the silicon rod is cut to obtain two silicon rod blanks.

The advantageous effect of the present application is that a silicon rod is placed in a clamping space formed between an upper jacking block and a lower jacking block abutting against the bottom surface of the silicon rod, and the first jacking head and the second jacking head of the upper jacking block and the movable end of the auxiliary tensioner abut against the top surface of the silicon rod. In the half-slitting process, the movable end of the auxiliary tensioner is separated from the top surface of the silicon rod, and at this time, since the first jacking head and the second jacking head abut against the top surface of the silicon rod, the silicon rod does not tilt; then the cutting end of the cutting assembly enters between the auxiliary tensioner and the first jacking head from below the movable end of the auxiliary tensioner; then the movable end of the auxiliary tensioner abuts against the top surface of the silicon rod again, and then the first jacking head is separated from the top surface of the silicon rod, and at this time, since the movable end of the auxiliary tensioner abuts against the second jacking head on the top surface of the silicon rod, the silicon rod does not tilt; then the cutting end of the cutting assembly enters between the first jacking head and the second jacking head from below the first jacking head (i.e., entering into the clamping space); finally, the first jacking head re-abuts against the top surface of the silicon rod, and the cutting end of the cutting assembly cuts from the top end of the silicon rod to the bottom end of the silicon rod until the silicon rod is cut to obtain two silicon rod blanks.

DETAILED DESCRIPTION OF THE EMBODIMENTS

Figure 1:
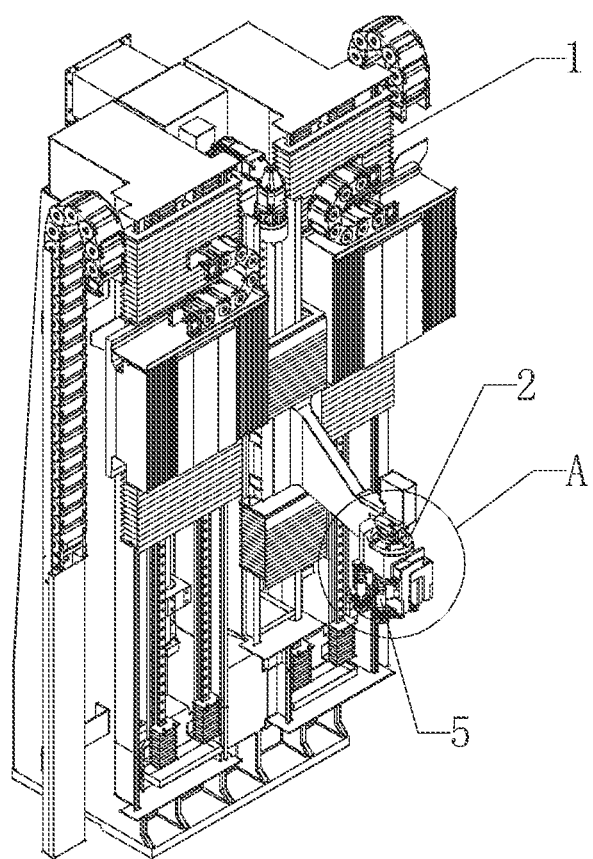
FIG. 1 is a schematic diagram showing an upper jacking structure according to an embodiment of the present application.

In order to explain the technical contents, the objects, and the effects of the present application in detail, the embodiments will be described below Referring to the accompanying drawings.

Silicon crystals are widely used in the field of photovoltaic power generation. In order to meet the quality parameters of silicon crystal rods and the shape and size of the next procedure, preliminary processing of silicon rods is usually required, such as cutting the silicon rods with circular cross-section into silicon rods with square cross-section. However, the current cutting device cannot move a cutting line to a clamping area where the device clamps the silicon rod to perform a half-slitting operation on the silicon rod, i.e., cutting the silicon rod into two silicon rod blanks along a length direction of the silicon rod.

Based on this, the present application provides an upper jacking structure, a half-slitting machine and a half-slitting method to solve the problem that a cutting device cannot move a cutting line to a clamping area where the device clamps a silicon rod to perform a half-slitting operation on the silicon rod.

Referring to FIGS. 1, 3, 4 and 8, the half-slitting machine of the present application includes a lower jacking block 6 located below the upper jacking block 2, a cutting assembly 7, and an upper jacking structure. A clamping space is formed between the lower jacking block 6 and the upper jacking block 2, and a cutting end of the cutting assembly 7 is movable in a vertical direction and a horizontal direction into and out of the clamping space. The upper jacking structure includes a first linear reciprocating device 1, an upper jacking block 2 and an auxiliary tensioner 3, the movable end of the first linear reciprocating device 1 moves in a vertical direction, and the upper jacking block 2 is provided on the movable end of the first linear reciprocating device 1; the upper jacking block 2 has a first jacking surface symmetrically provided with a first jacking head 21 and a second jacking head 22 at either side of a center line of the first jacking surface, and the first jacking head 21 and the second jacking head 22 are slidingly provided on the first jacking surface in a vertical direction; the auxiliary tensioner 3 is located on the side of the upper jacking block 2 close to the first jacking head 21, the auxiliary tensioner 3 having a movable end moving in the vertical direction. A motor-driven linear slide mechanism is preferably used as the first linear reciprocating device 1.

As apparent from the above description, the present application has an advantageous effect in that: the auxiliary tensioner 3 and the upper jacking block 2 are controlled by the first linear reciprocating device 1 to approach and move away from the silicon rod 10 placed on the lower jacking block 6. When the silicon rod 10 needs to be half-sectioned, the auxiliary tensioner 3 is separated from the top surface of the silicon rod 10 to free an aisle so that the cutting end of the cutting assembly 7 enters between the auxiliary tensioner 3 and the first jacking head 21 from below the movable end of the auxiliary tensioner 3; since the first jacking head 21 and the second jacking head 22 abut against the top surface of the silicon rod 10, when the auxiliary tensioner 3 removes the pressure on the top surface of the silicon rod 10, the silicon rod 10 is restrained by the first jacking head 21, thereby preventing the silicon rod 10 from tilting up.

Then the movable end of the auxiliary tensioner 3 abuts against the top surface of the silicon rod 10 again, and then the first jacking head 21 is separated from the top surface of the silicon rod 10 to free an aisle, so that the cutting end of the cutting assembly 7 enters between the first jacking head 21 and the second jacking head 22 from below the first jacking head 21 (i.e., entering into the clamping space of the half-slitting machine for clamping the silicon rod 10); since the movable end of the auxiliary tensioner 3 abuts against the top surface of the silicon rod 10 with the second jacking head 22, when the first jacking head 21 removes the pressure on the top surface of the silicon rod 10, the silicon rod 10 is restrained by the movable end of the auxiliary tensioner 3, thereby preventing the silicon rod 10 from tilting up.

Finally, the cutting end of the cutting assembly 7 is cut from a top end of the silicon rod 10 to a bottom end of the silicon rod 10, thereby obtaining two silicon rod blanks.

Referring to FIGS. 3 to 6, further, clastic members 24 respectively connected to the first jacking head 21 and the second jacking head 22 are provided in the upper jacking block 2, and the upper jacking block 2 has a fully-compressed state, a semi-compressed state, and a non-compressed state; when the upper jacking block 2 is in a fully-compressed state, the first jacking head 21 and second jacking head 22 respectively compress the correspondingly connected elastic members 24, and abut against the top surface of the silicon rod 10; when the upper jacking block 2 is in a semi-compressed state, the first jacking head 21 does not compress the correspondingly connected clastic members 24, the second jacking head 22 compresses the correspondingly connected clastic members 24, and the second jacking head 22 abuts against the top surface of the silicon rod 10; when the upper jacking block 2 is in a non-compressed state, neither the first jacking head 21 nor the second jacking head 22 compresses the correspondingly connected elastic members 24 and is separated from the top surface of the silicon rod 10. The clastic member 24 is preferably a spring.

It can be seen from the above description that when the cutting end of the cutting assembly 7 enters between the auxiliary tensioner 3 and the first jacking head 21 and the cutting end of the cutting assembly 7 performs a half-slitting operation, the upper jacking block 2 is in a fully-compressed state to ensure the stability of the silicon rod 10. When the cutting end of the cutting assembly 7 enters between the first jacking head 21 and the second jacking head 22, the upper jacking block 2 is in a semi-compressed state. When it is required to put or take the silicon rod 10 into or out of the clamping space of the half-slitting machine for clamping the silicon rod 10, the upper jacking block 2 is in a non-compressed state.

In an alternative embodiment, the maximum extension of the first jacking head 21 on the upper jacking head block 2 is 7 mm, the maximum extension of the second jacking head 22 on the upper jacking head block 2 is 12 mm, and when the upper jacking head block 2 is in a fully-compressed state, the extension of the first jacking head 21 and the second jacking head 22 on the upper jacking head block 2 is equal and the extension is 1-2 mm. During the process that the cutting end of the cutting assembly 7 enters between the first jacking head 21 and the second jacking head 22, the first linear reciprocating device 1 firstly moves the upper jacking block 2 away from the silicon rod 10, so that the first jacking head 21 reaches 7 mm of the maximum extension amount on the upper jacking block 2 and abuts against the top surface of the silicon rod 10, so that the second jacking head 22 reaches 7 mm of the extension amount on the upper jacking block 2 and abuts against the top surface of the silicon rod 10, and then the first linear reciprocating device 1 continues to move 3 mm-4 mm in a direction to drive the upper jacking block 2 away from the silicon rod 10; the first jacking head 21 is separated from the top surface of the silicon rod 10 to free an aisle through which the cutting end of the cutting assembly 7 passes.

In an alternative embodiment, the elastic member 24 provided in the jacking block 1 may be replaced with a cylinder or an electric motor that drives the first jacking head 21 and the second jacking head 22 in a vertical direction.

Figure 3:
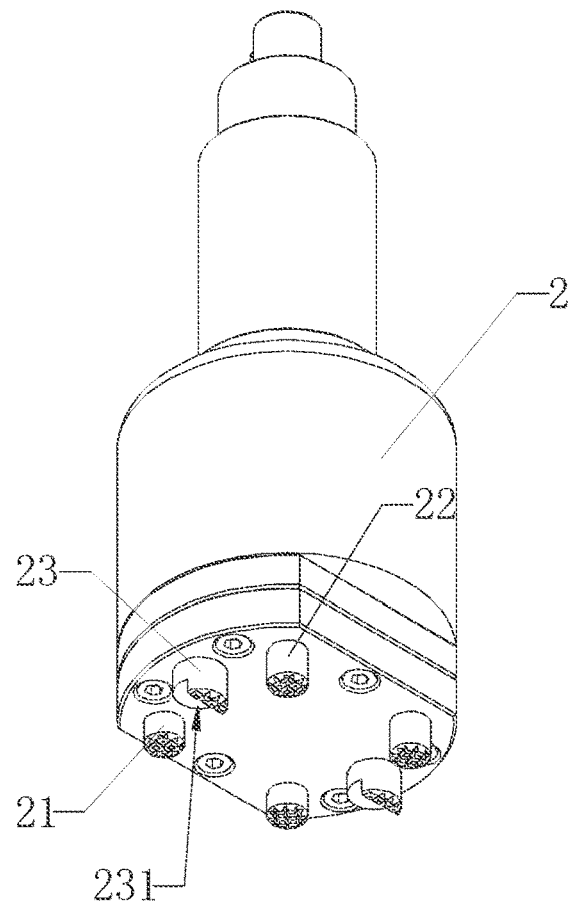
FIG. 3 is a schematic diagram showing an upper jacking block of an upper jacking structure according to an embodiment of the present application.
Figure 4:
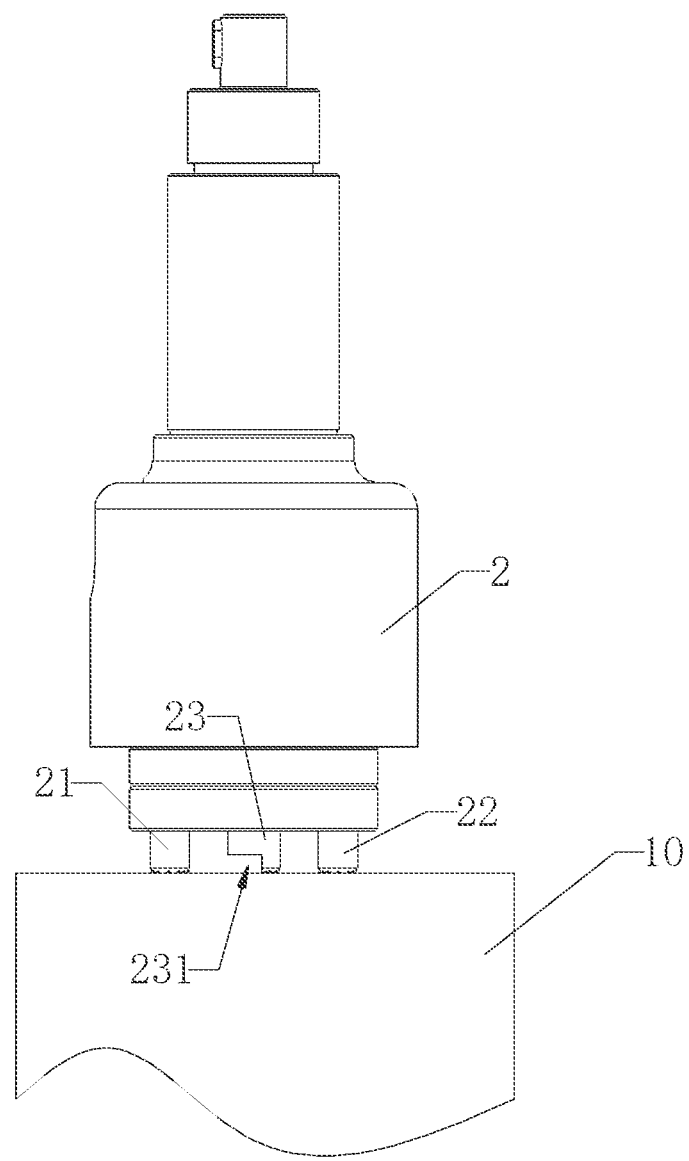
FIG. 4 is a schematic diagram showing a structure of an upper jacking block for jacking a silicon rod according to an embodiment of the present application.
Figure 5:
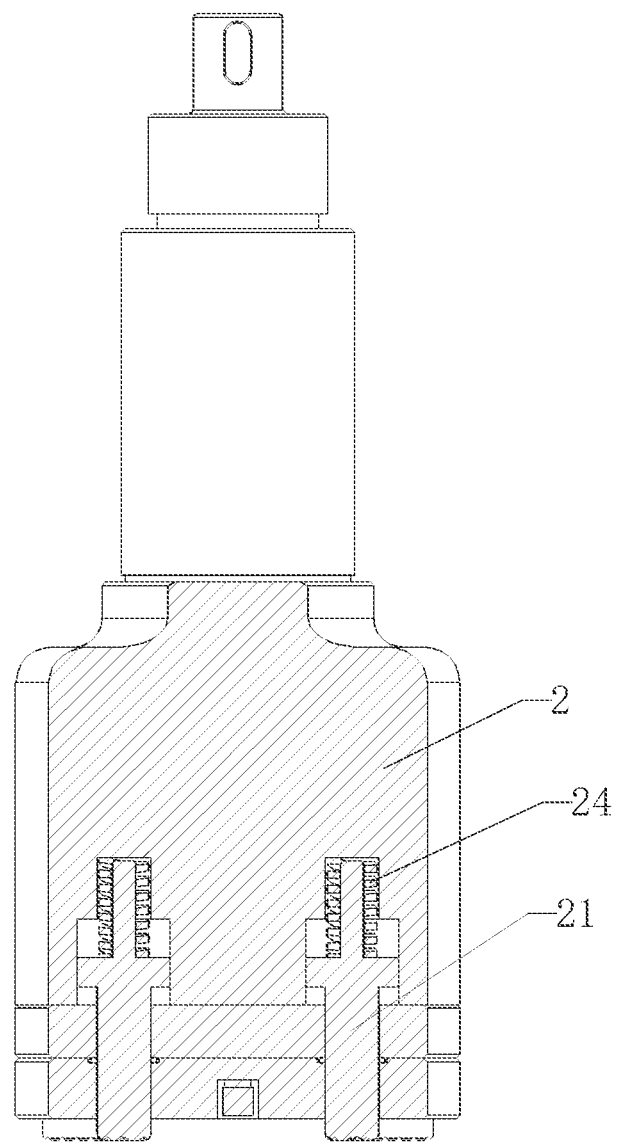
FIG. 5 is a schematic diagram showing an assembly section of a first jacking head of an upper jacking structure and an elastic member on an upper jacking block according to an embodiment of the present application.
Figure 6:
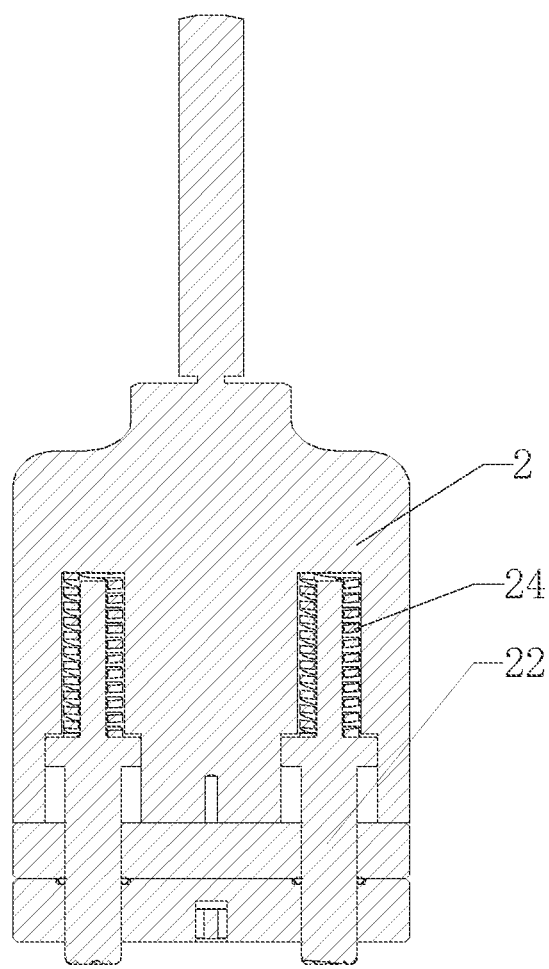
FIG. 6 is a schematic diagram showing an assembly section of a second jacking head of an upper jacking structure and an elastic member on an upper jacking block according to an embodiment of the present application.
Figure 7:
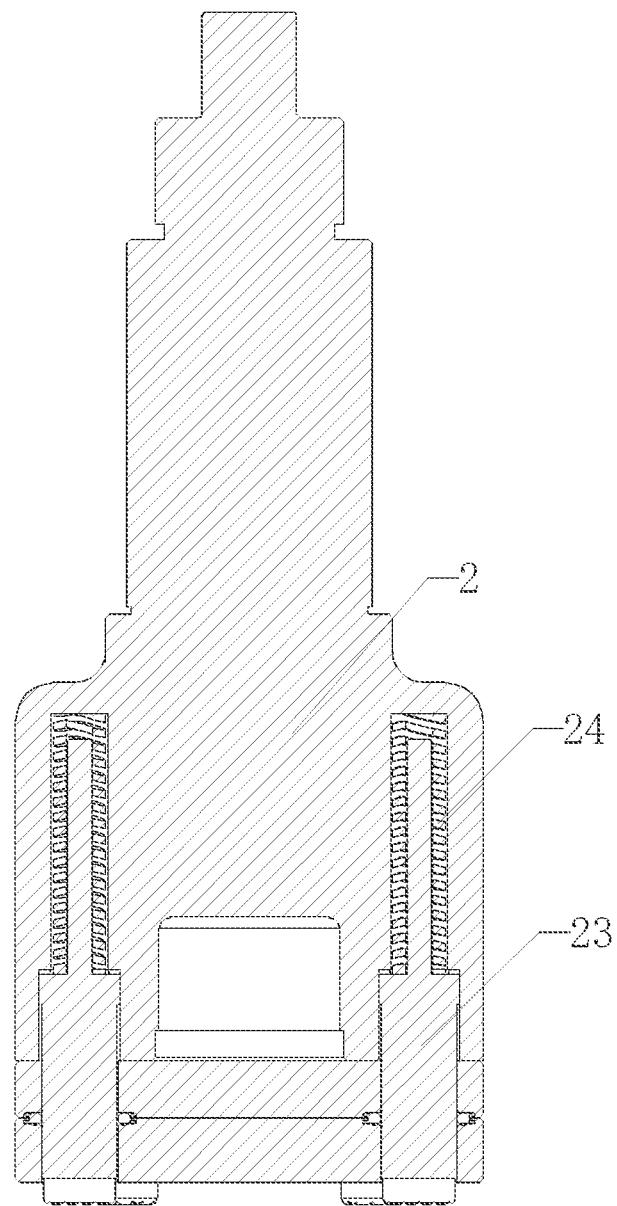
FIG. 7 is a schematic diagram showing an assembly section of a third jacking head of an upper jacking structure and an elastic member on an upper jacking block according to an embodiment of the present application.

Referring to FIGS. 3, 4 and 7, further, a third jacking head 23 is slidingly provided on the first jacking surface in a vertical direction, and the third jacking head 23 is located on a center line of the first jacking surface, and an elastic member 24 connected to the third jacking head 23 is provided in the upper jacking block 2; when the upper jacking block 2 is in a fully-compressed state, the third jacking head 23 compresses the correspondingly connected elastic members 24 and abuts against the top surface of the silicon rod 10; when the upper jacking block 2 is in a semi-compressed state, the third jacking head 23 compresses the correspondingly connected elastic members 24 and abuts against the top surface of the silicon rod 10; the third jacking head 23 does not compress the correspondingly connected elastic members 24 and is separated from the top surface of the silicon rod 10 when the upper jacking block 2 is in a non-compressed state. When the upper jacking block 2 is in a fully-compressed state, the extension amount of the third jacking head 23 on the upper jacking block 2 is equal to the extension amount of the second jacking head 22 on the upper jacking block 2; when the upper jacking block 2 is in a semi-compressed state, the extension amount of the third jacking head 23 on the upper jacking block 2 is equal to the extension amount of the second jacking head 22 on the upper jacking block 2; and when the upper jacking block 2 is in a non-compressed state, the extension amount of the third jacking head 23 on the upper jacking block 2 is equal to the extension amount of the second jacking head 22 on the upper jacking block 2.

It can be seen from the above-mentioned description that adding the third jacking head 23 and the second jacking head 22 to abut against the top surface of the silicon rod 10 can further improve the stability of the silicon rod 10 in a fully-compressed state and a semi-compressed state of the upper jacking block 2.

Referring to FIG. 3, further, an end of the third jacking head 23 remote from the upper jacking block 2 is provided with a notch 231 facing the first jacking head 21.

It can be seen from the above description that the stability of the silicon rod 10 in the clamping space can be maximally improved by the first jacking head 21 and the second jacking head 22 respectively abutting against opposite side edges of the top of the silicon rod 10, and the third jacking head 23 abutting against the middle position of the top surface of the silicon rod 10. In addition, the third jacking head 23 is provided with a notch 231, which can provide more moving space for the cutting end of the cutting assembly 7, thereby improving the flexibility of the cutting position of the cutting assembly 7 in the clamping space.

Figure 2:
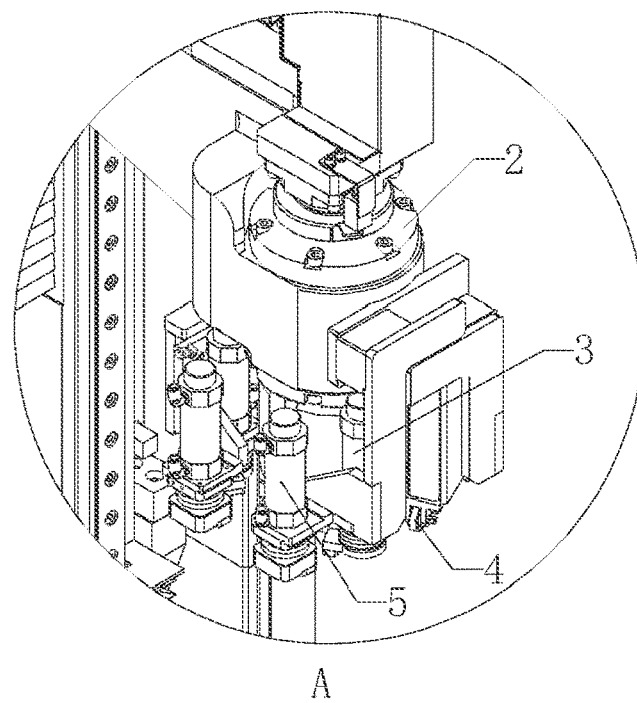
FIG. 2 is an enlarged view showing a portion A of an upper jacking structure of FIG. 1.

In addition, referring to FIG. 2, an upper jacking structure further includes a sensor 4 having a detection end facing an end of the first upper jacking block 21 away from the upper jacking block 2, or a second jacking head 22 away from the upper jacking block 2, or a third top 23 away from the upper jacking block 2.

It can be seen from the above description that when the sensor 4 determines that the respective jacking heads of the upper jacking block 2 have approached the silicon rod 10, the first linear reciprocating device 1 can slow down the speed of the upper jacking block 2 approaching the silicon rod 10 by means of a signal to avoid the excessive speed of the upper jacking block 2 approaching the silicon rod 10.

Referring to FIG. 2, further, an upper jacking structure further includes a plurality of edge skin jacking tensioners 5 positioned at the sides of the upper jacking block 2 and having movable ends moving in a vertical direction.

As can be seen from the above description, when it is necessary to cut the edge skin of the silicon rod 10 to cut the cylindrical silicon rod 10 into the rectangular silicon rod 10, the top of the portion of the edge skin to be cut of the silicon rod 10 is pressed by the movable end of the edge skin tensioner 5.

Figure 8:
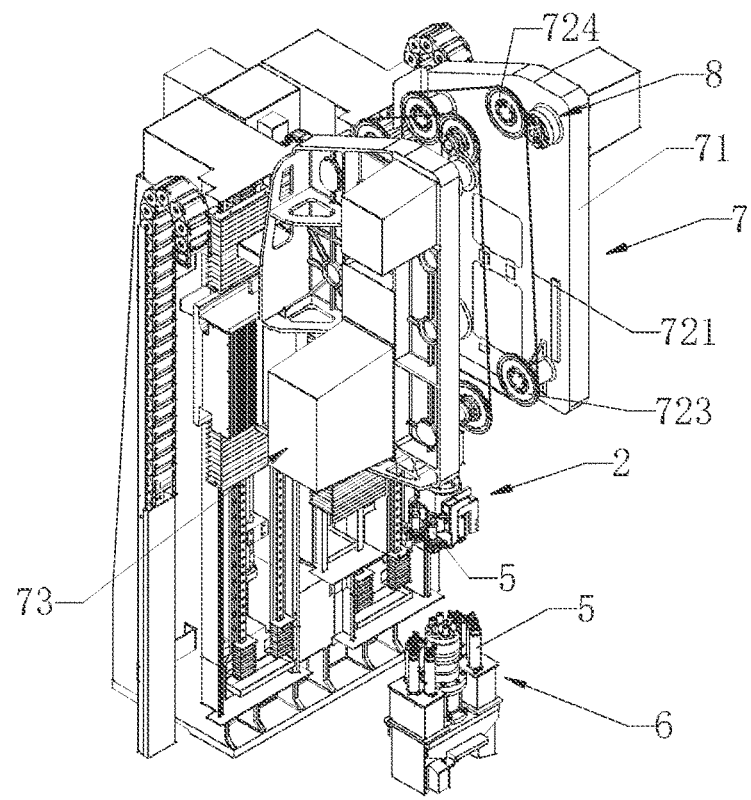
FIG. 8 is a schematic diagram showing a structure of a half-slitting machine according to an embodiment of the present application.
Figure 9:
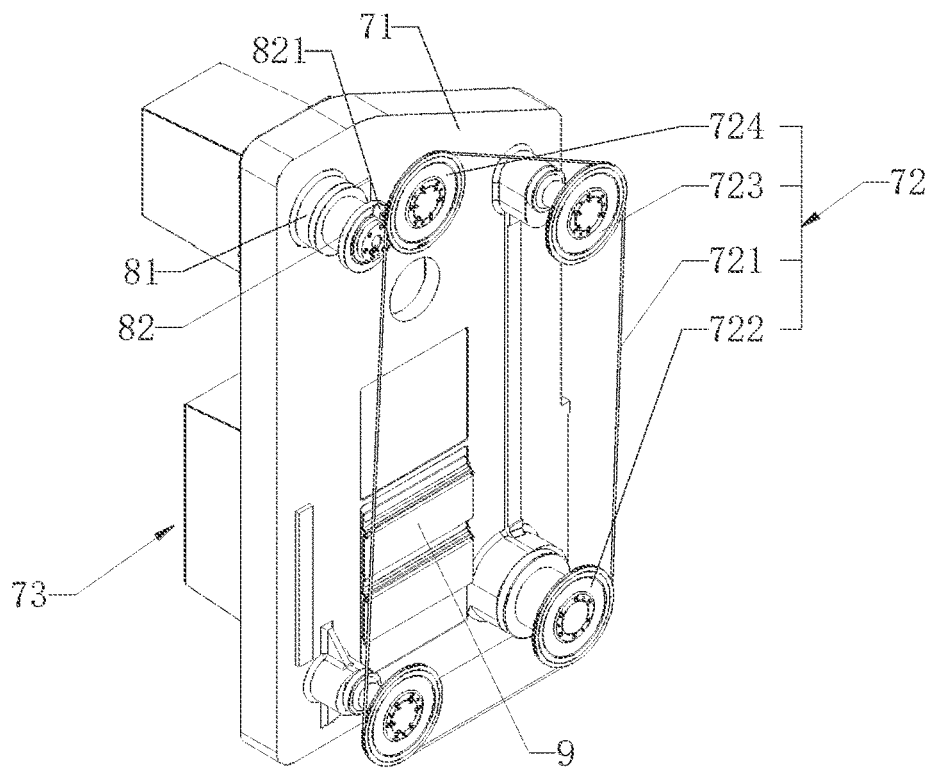
FIG. 9 is a schematic diagram showing a cutting assembly of a half-slitting machine according to an embodiment of the present application.

Referring to FIGS. 8 and 9, further, the cutting assembly 7 includes a vertically provided first mounting plate 71 movable in a vertical direction and a horizontal direction, the first mounting plate 71 is provided with a through hole in a thickness direction, and a wire cutting train 72 and a clamper 73 respectively provided at both ends of the first mounting plate 71 in a thickness direction; the cutting end of the wire cutting train 72 encloses a clamping space on the mounting panel, and the clamper 73 includes a holder that can protrude into the clamping space through the through hole.

It can be seen from the above description that after the first mounting plate 71 drives the wire cutting train 72 to complete the half-slitting operation on the silicon rod 10, the closest silicon rod blank is clamped away from the other silicon rod blank by the clamper 73, so that a wire-withdrawal space is formed between the two silicon rod blanks for the wire cutting train 72 to move to the top of the silicon rod blank.

Figure 10:
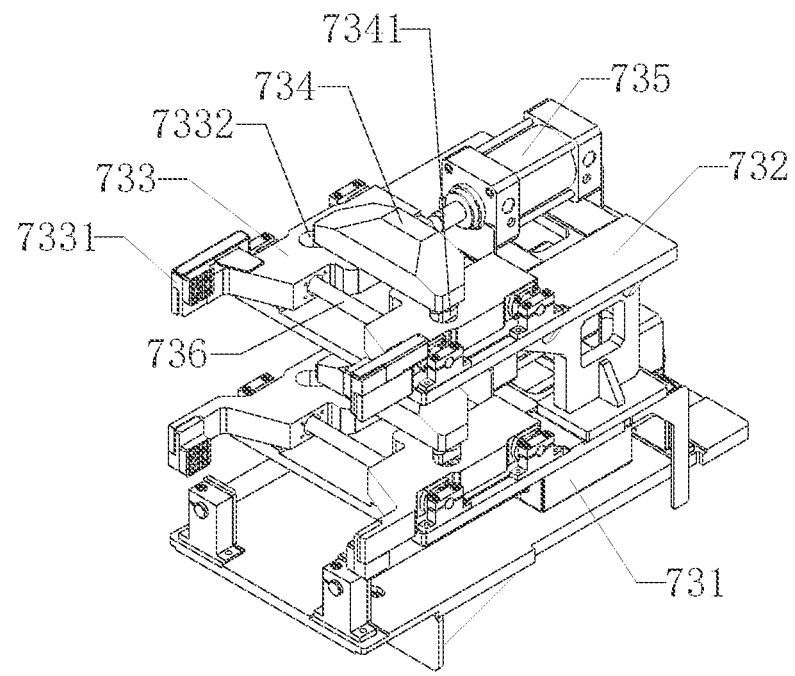
FIG. 10 is a schematic diagram showing a clamper structure of a half-slitting machine according to an embodiment of the present application.

Referring to FIG. 10, further, the clamper 73 includes a second linear reciprocating device 731 having a movable end moving in parallel to the thickness direction of the first mounting plate 71, and at least one layer of the holder is provided on the movable end of the second linear reciprocating device 731 in a direction parallel to the length direction of the first mounting plate 71. A cylinder is preferably used as the second linear reciprocating device 731, and it is preferred that the movable end of the second linear reciprocating device 731 is provided with two layers of holders along the length direction parallel to the first mounting plate 71, and the two layers of holders can improve the stability of the clamper 73 for clamping a silicon rod blank, and the flexibility of the clamper 73 for clamping silicon rod blanks of different length sizes.

Referring to FIG. 10, further, the holder includes a second mounting plate 732 provided on the movable end of the second linear reciprocating device 731 and a wedge 733 relatively slidably provided on the second mounting plate 732 in a direction perpendicular to the moving direction of the movable end of the second linear reciprocating device 731, and the wedge 733 having a gripping arm 7331 protrudes out of the plate surface of the second mounting plate 732. A cushion block is provided on an end face of the gripping arm 7331 abutting against the silicon rod blank to avoid scratching the surface of the silicon rod blank during the clamping process.

As can be seen from the above description, the wedge 733 on the second mounting plate 732 can be moved towards or away from the silicon rod blank using the second linear reciprocating device 731. In the process of clamping the silicon rod blank, the silicon rod blank is clamped by the two wedges 733 coming close to each other.

Referring to FIG. 10, the holder further includes a push-pull block 734 provided with a guide slot 7332 inclined toward the side of the second mounting plate 732, and a driving member 735 provided with a guide post 7341 inserted into the guide slot 7332 of the wedge 733 slidingly provided opposite to each other, the movable end of the driving member 735 is connected to the push-pull block 734, and the moving direction of the movable end of the driving member 735 is parallel to the moving direction of the movable end of the second linear reciprocating device 731. The driving member 735 is preferably a cylinder.

It can be seen from the above description that since the distance between the guide posts 7341 on the push-pull block 734 does not change, when the movable end of the driving member 735 controls the movement of the push-pull block 734, the guide posts 7341 move within the guide slots 7332 of the wedges 733, thereby forcing the two wedges 733 to move relative to each other.

Referring to FIG. 10, the holder further includes a guide rail 736 provided on the plate surface of the second mounting plate 732, and the wedge 733 is slidably provided on the guide rail 736.

As can be seen from the above description, the moving direction of the wedge 733 can be ensured by the guide rail 736.

Referring to FIG. 9, further, the wire cutting train 72 includes a cutting line 721 annularly provided in a wire groove of a driving wheel 722, a follower wheel 723, and a tensioning wheel 724 which are provided on one end surface of the first mounting plate 71 in a thickness direction. It is preferable to provide two follower wheels 723, one driving wheel 722, and one tensioning wheel 724 in a four-wheel train structure to improve the stability of the wire 721 of the wire cutting train 72 during operation.

Referring to FIG. 9, further, a tensioning mechanism 8 is provided on the first mounting plate 71 and includes a bearing seat 81 and a rotating shaft 82; the bearing seat 81 is provided on the first mounting plate 71, a rotating shaft 82 is rotatably mounted in the bearing seat 81 via a bearing, and one end of the rotating shaft 82 remote from the bearing seat 81 is eccentrically provided with a connecting arm 821 connected to a tensioning wheel 724.

As can be seen from the above description, since the rotating shaft 82 is connected to the tensioning wheel 724 via the connecting arm 821, the degree to which the tensioning wheel 724 tensions the cutting line 721 can be controlled by rotating the rotating shaft 82.

In an alternative embodiment, a motor is drivingly connected to an end of the rotating shaft 82 remote from the tensioning wheel 724.

In another alternative embodiment, a counterweight is connected to an end of the rotating shaft 82 remote from the tensioning wheel 724.

Referring to FIG. 9, further, a shield 9 is provided on a through-hole of the first mounting plate 71, two opposite side edges of the shield 9 are respectively a fixed edge and a free edge, the fixed edge of the shield 9 is connected to the first mounting plate 71, and the direction from the fixed edge to the free edge of the shield 9 is parallel to a length direction of the first mounting plate 71. Preferably, the shield 9 is located on the end face of the first mounting plate 71 where the cutting end of the wire cutting train 72 is located.

It can be seen from the above-mentioned description that the shield 9 is connected to the first mounting plate 71 via a fixed edge, so that not only the clamping of the silicon rod blank by the holder passing through the through-hole of the first mounting plate 71 is not affected, but also a coolant splashed by the wire cutting train 72 during the cutting operation can be prevented from carrying the waste chips to the clamper 73 through the through-hole of the first mounting plate 71.

Figure 11:
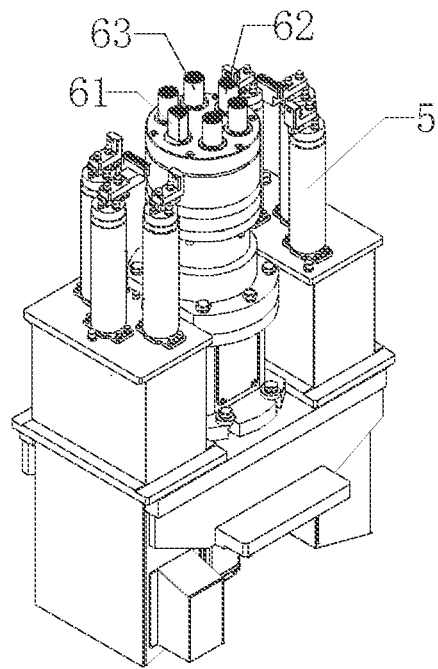
FIG. 11 is a schematic diagram showing a structure of a lower jacking block of a half-slitting machine according to an embodiment of the present application.

Referring to FIGS. 8 and 11, the lower jacking block 6 has a second jacking surface, the second jacking surface is provided with a fourth jacking head 61 corresponding to the first jacking head 21, and the second jacking surface is provided with a fifth jacking head 62 corresponding to the second jacking head 22.

It can be seen from the above-mentioned description that the lower jacking block 6 is provided with a fourth jacking head 61 corresponding to the first jacking head 21 and a fifth jacking head 62 corresponding to the second jacking head 22, which can further improve the stability of the silicon rod 10 between the upper jacking block 2 and the lower jacking block 6.

In an alternative embodiment, the second jacking surface is provided with a sixth jacking head 63 corresponding to the third jacking head 23.

Referring to FIG. 11, a plurality of edge skin tensioners 5 having movable ends moving in a vertical direction are provided at the side of the lower jacking block 6.

It can be seen from the above description that when it is necessary to cut the edge skin of the silicon rod 10 to cut the cylindrical silicon rod 10 into a rectangular silicon rod 10, the edge skin cut from the silicon rod 10 can be clamped by the cooperation of the edge skin tensioner 5 on the lower jacking block 6 and the edge skin tensioner 5 on the upper jacking block 2.

Figure 12:
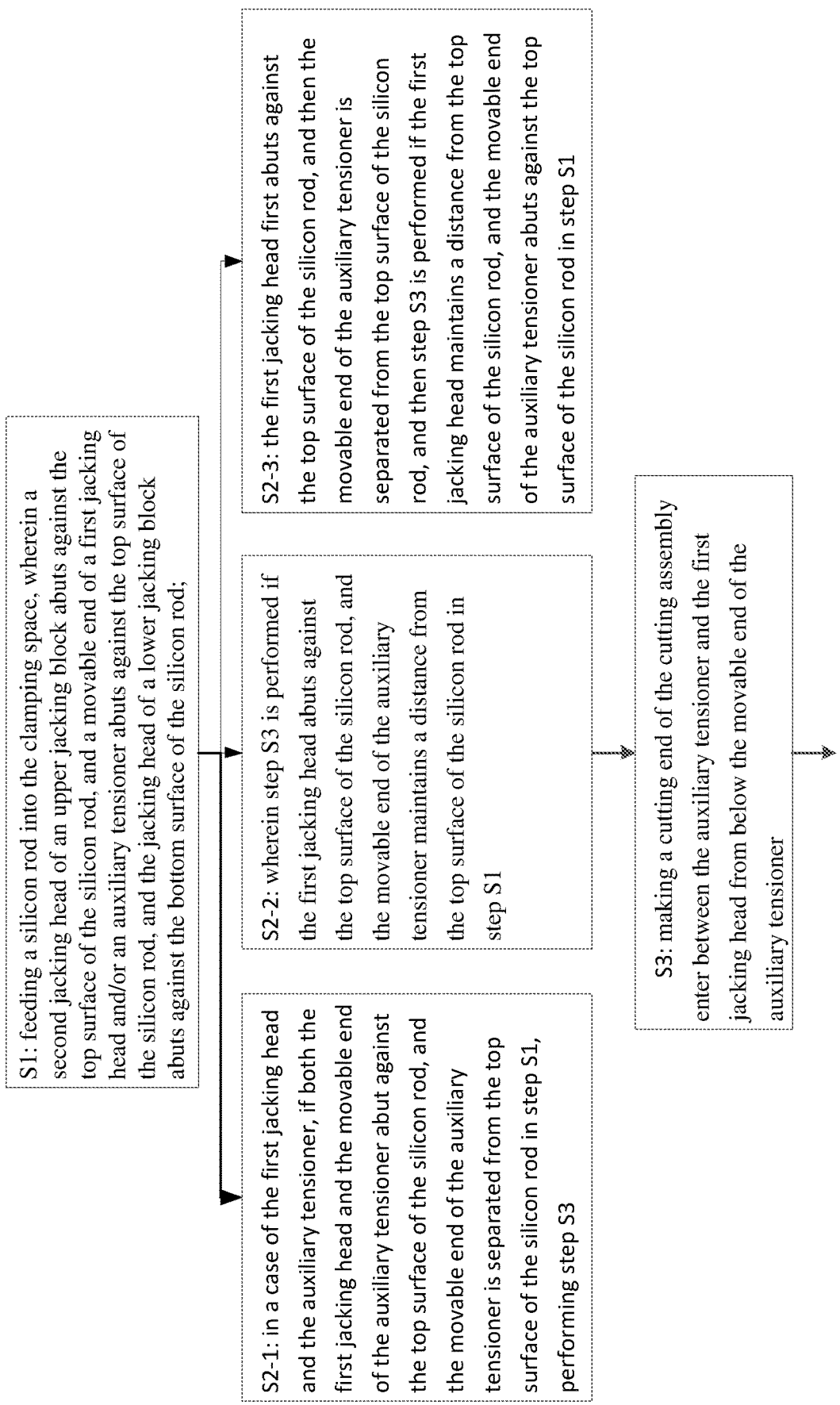
FIG. 12 is a schematic diagram showing the first step flow of a half-slitting process according to an embodiment of the present application.
Figure 13:
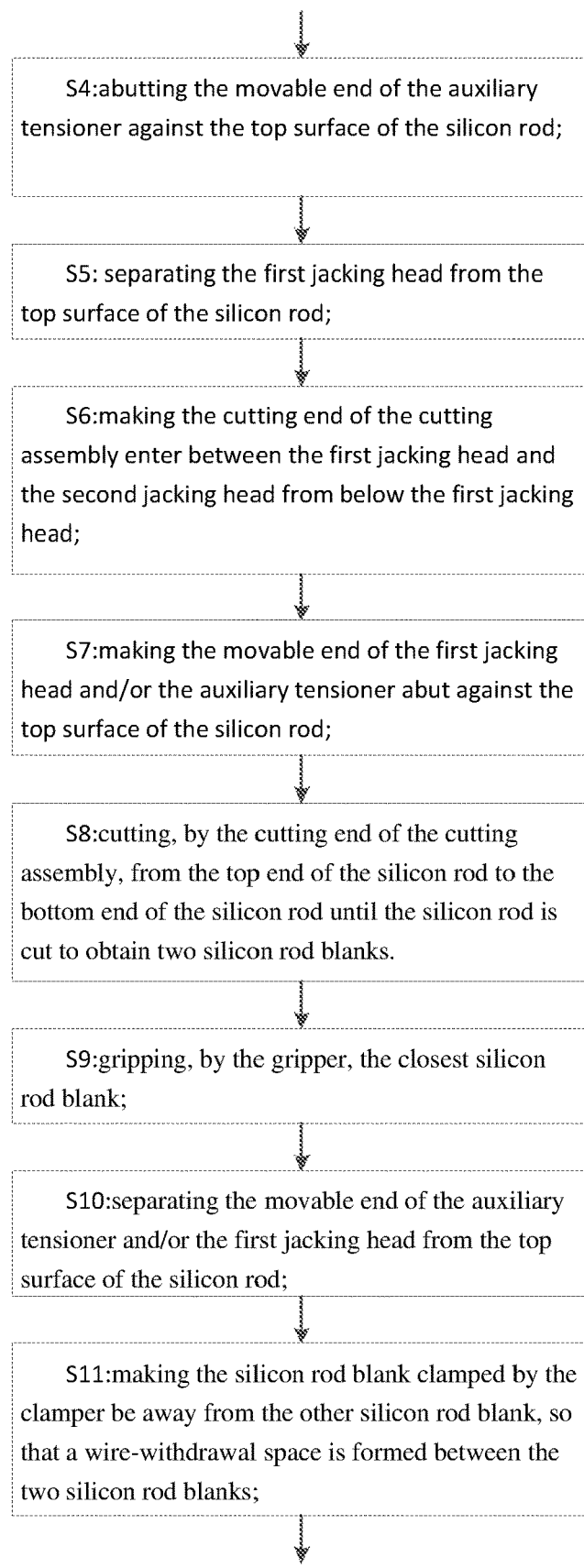
FIG. 13 is a schematic diagram showing the second step flow of a half-slitting process according to an embodiment of the present application.
Figure 14:
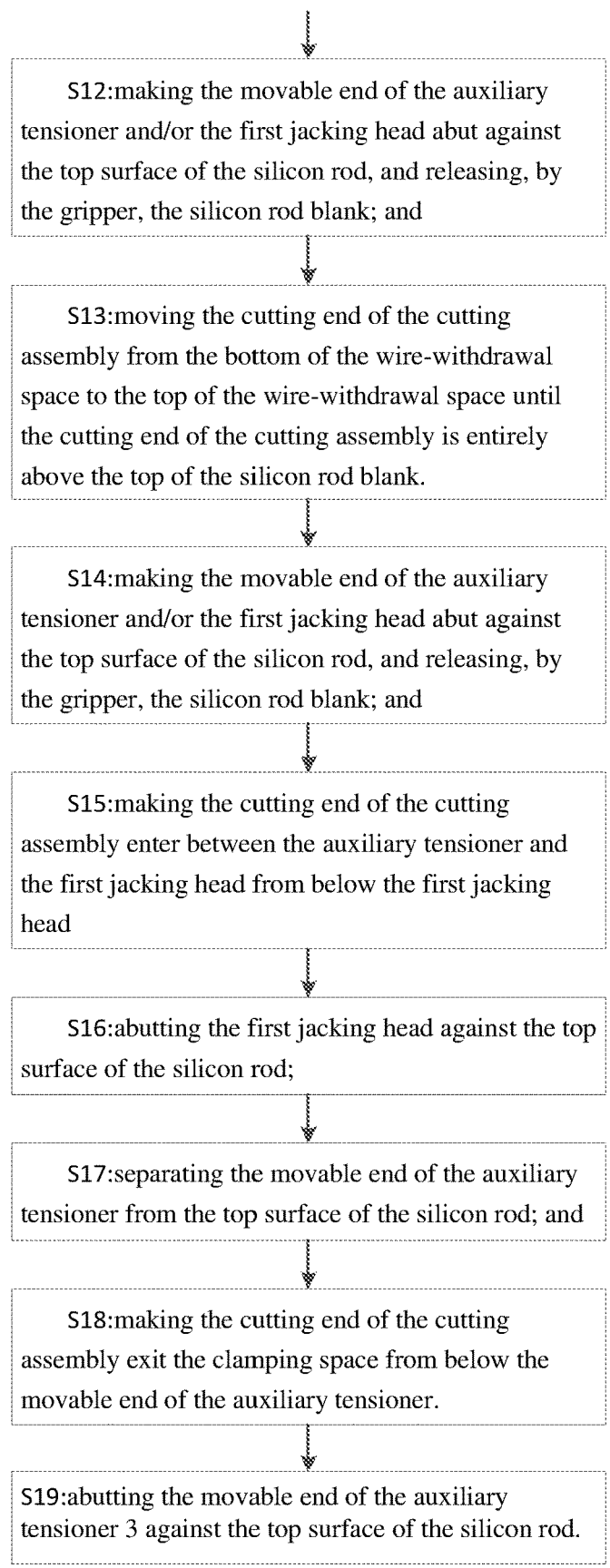
FIG. 14 is a schematic diagram showing the third step flow of a half-slitting process according to an embodiment of the present application.

Referring to FIGS. 12 to 14, a half-slitting process of the present application includes performing a cutting-feed process and a half-slitting process.

The performing the cutting-feed process includes:
step S1: feeding the silicon rod into the clamping space, where the jacking head on the upper jacking block 2 and the movable end of the auxiliary tensioner 3 abut against the top surface of the silicon rod, and the jacking head of the lower jacking block 6 abuts against the bottom surface of the silicon rod;
step S2: separating the movable end of the auxiliary tensioner 3 from the top surface of the silicon rod;
step S3: making the cutting end of the cutting assembly 7 enter between the auxiliary tensioner 3 and the first jacking head 21 from below the movable end of the auxiliary tensioner 3;
step S4: abutting the movable end of the auxiliary tensioner 3 against the top surface of the silicon rod;
step S5: separating the first jacking head 21 from the top surface of the silicon rod;
step S6: making the cutting end of the cutting assembly 7 enter between the first jacking head 21 and the second jacking head 22 from below the first jacking head 21; and
step S7: abutting the first jacking head 21 against the top surface of the silicon rod.

The half-slitting process includes step S8: cutting, by the cutting end of the cutting assembly 7, from the top end of the silicon rod to the bottom end of the silicon rod until the silicon rod is cut to obtain two silicon rod blanks.

Further, a half-slitting method further includes a wire-withdrawal process including:
step S9: gripping, by the gripper 73, the closest silicon rod blank;
step S10: separating the movable end of the auxiliary tensioner 3 and the first jacking head 21 from the top surface of the silicon rod;
step S11: making the silicon rod blank clamped by the clamper 73 be away from the other silicon rod blank, so that a wire-withdrawal space is formed between the two silicon rod blanks; the width of the wire-withdrawal space is 4 mm-6 mm;
step S12: making the movable end of the auxiliary tensioner 3 and the first jacking head 21 abut against the top surface of the silicon rod, and releasing, by the gripper 73, the silicon rod blank; and
step S13: moving the cutting end of the cutting assembly 7 from the bottom of the wire-withdrawal space to the top of the wire-withdrawal space until the cutting end of the cutting assembly is entirely above the top of the silicon rod blank.

Further, the wire-withdrawal process further includes:
step S14: separating the first jacking head 21 from the top surface of the silicon rod;
step S15: making the cutting end of the cutting assembly 7 enter between the auxiliary tensioner 3 and the first jacking head 21 from below the first jacking head 21;
step S16: abutting the first jacking head 21 against the top surface of the silicon rod;
step S17: separating the movable end of the auxiliary tensioner 3 from the top surface of the silicon rod;
step S18: making the cutting end of the cutting assembly 7 exit the clamping space from below the movable end of the auxiliary tensioner 3; and
step S19: abutting the movable end of the auxiliary tensioner 3 against the top surface of the silicon rod.

Embodiment I

Referring to FIGS. 1 to 7, an upper jacking structure includes a first linear reciprocating device 1, an upper jacking block 2 and an auxiliary tensioner 3, the movable end of the first linear reciprocating device 1 moves in a vertical direction, and the upper jacking block 2 is provided on the movable end of the first linear reciprocating device 1; the upper jacking block 2 has a first jacking surface symmetrically provided with a first jacking head 21 and a second jacking head 22 at either side of a center line of the first jacking surface, and the first jacking head 21 and the second jacking head 22 are slidingly provided on the first jacking surface in a vertical direction; the auxiliary tensioner 3 is located on the side of the upper jacking block 2 close to the first jacking head 21, the auxiliary tensioner 3 having a movable end moving in the vertical direction. Elastic members 24 respectively connected to the first jacking head 21 and the second jacking head 22 are provided in the upper jacking block 2, and the upper jacking block 2 has a fully-compressed state, a semi-compressed state, and a non-compressed state; when the upper jacking block 2 is in a fully-compressed state, the first jacking head 21 and second jacking head 22 respectively compress the correspondingly connected elastic members 24, and abut against the top surface of the silicon rod 10; when the upper jacking block 2 is in a semi-compressed state, the first jacking head 21 does not compress the correspondingly connected elastic members 24, the second jacking head 22 compresses the correspondingly connected elastic members 24, and the second jacking head 22 abuts against the top surface of the silicon rod 10; when the upper jacking block 2 is in a non-compressed state, neither the first jacking head 21 nor the second jacking head 22 compresses the correspondingly connected elastic members 24 and is separated from the top surface of the silicon rod 10. A third jacking head 23 is slidingly provided on the first jacking surface in a vertical direction, and the third jacking head 23 is located on a center line of the first jacking surface, and an elastic member 24 connected to the third jacking head 23 is provided in the upper jacking block 2; when the upper jacking block 2 is in a fully-compressed state, the third jacking head 23 compresses the correspondingly connected elastic members 24 and abuts against the top surface of the silicon rod 10; when the upper jacking block 2 is in a semi-compressed state, the third jacking head 23 compresses the correspondingly connected elastic members 24 and abuts against the top surface of the silicon rod 10; the third jacking head 23 does not compress the correspondingly connected elastic members 24 and is separated from the top surface of the silicon rod 10 when the upper jacking block 2 is in a non-compressed state. An end of the third jacking head 23 remote from the upper jacking block 2 is provided with a notch 231 facing the first jacking head 21.

Embodiment II

This embodiment provides a half-slitting machine having an upper jacking structure of Embodiment I, specifically as follows:

Referring to FIGS. 8 and 11, the half-slitting machine includes a lower jacking block 6 located below the upper jacking block 2, a cutting assembly 7, and an upper jacking structure, a clamping space is formed between the lower jacking block 6 and the upper jacking block 2, and a cutting end of the cutting assembly 7 is movable in a vertical direction and a horizontal direction into and out of the clamping space. The lower jacking block 6 has a second jacking surface, the second jacking surface is provided with a fourth jacking head 61 corresponding to the first jacking head 21, and the second jacking surface is provided with a fifth jacking head 62 corresponding to the second jacking head 22.

Embodiment III

This embodiment further defines the structure of the cutting assembly 7 based on Embodiment II, specifically as follows:

Referring to FIG. 9, the cutting assembly 7 includes a vertically provided first mounting plate 71 movable in a vertical direction and a horizontal direction, the first mounting plate 71 is provided with a through hole in a thickness direction, and a wire cutting train 72 and a clamper 73 respectively provided at both ends of the first mounting plate 71 in a thickness direction; the cutting end of the wire cutting train 72 encloses a clamping space on the mounting panel, and the clamper 73 includes a holder that can protrude into the clamping space through the through hole. The wire cutting train 72 includes a cutting line 721 annularly provided in a wire groove of a driving wheel 722, a follower wheel 723, and a tensioning wheel 724 which are provided on one end surface of the first mounting plate 71 in a thickness direction. A tensioning mechanism 8 is provided on the first mounting plate 71 and includes a bearing seat 81 and a rotating shaft 82; the bearing seat 81 is provided on the first mounting plate 71, a rotating shaft 82 is rotatably mounted in the bearing seat 81 via a bearing, and one end of the rotating shaft 82 remote from the bearing seat 81 is eccentrically provided with a connecting arm 821 connected to a tensioning wheel 724.

Embodiment IV

This embodiment further defines the structure of the clamper 73 based on Embodiment III, specifically as follows:

Referring to FIG. 10, the clamper 73 includes a second linear reciprocating device 731 having a movable end moving in parallel to the thickness direction of the first mounting plate 71. and at least two layers of the holders is provided on the movable end of the second linear reciprocating device 731 in a direction parallel to the length direction of the first mounting plate 71. The holder includes a second mounting plate 732 provided on the movable end of the second linear reciprocating device 731 and a wedge 733 relatively slidably provided on the second mounting plate 732 in a direction perpendicular to the moving direction of the movable end of the second linear reciprocating device 731, and the wedge 733 having a gripping arm 7331 protrudes out of the plate surface of the second mounting plate 732. The holder further includes a push-pull block 734 provided with a guide slot 7332 inclined toward the side of the second mounting plate 732, and a driving member 735 provided with a guide post 7341 inserted into the guide slot 7332 of the wedge 733 slidingly provided opposite to each other, the movable end of the driving member 735 is connected to the push-pull block 734, and the moving direction of the movable end of the driving member 735 is parallel to the moving direction of the movable end of the second linear reciprocating device 731. The holder further includes a guide rail 736 provided on the plate surface of the second mounting plate 732, and the wedge 733 is slidably provided on the guide rail 736.

Embodiment V

This embodiment discloses a half-slitting method based on Embodiment II, specifically as follows.

Referring to FIGS. 12 to 14, The half-slitting process includes performing a cutting-feed process and a half-slitting process.

The performing the cutting-feed process includes:
step S1: feeding the silicon rod into the clamping space, where the jacking head on the upper jacking block and the movable end of the auxiliary tensioner abut against the top surface of the silicon rod, and the jacking head of the lower jacking block abuts against the bottom surface of the silicon rod;
step S2: separating the movable end of the auxiliary tensioner from the top surface of the silicon rod;
step S3: making a cutting end of the cutting assembly enter between the auxiliary tensioner and the first jacking head from below the movable end of the auxiliary tensioner;
step S4: abutting the movable end of the auxiliary tensioner against the top surface of the silicon rod;
step S5: separating the first jacking head from the top surface of the silicon rod;
step S6: making the cutting end of the cutting assembly enter between the first jacking head and the second jacking head from below the first jacking head; and
step S7: abutting the first jacking head against the top surface of the silicon rod.

The half-slitting process includes step S8: cutting, by the cutting end of the cutting assembly, from the top end of the silicon rod to the bottom end of the silicon rod until the silicon rod is cut to obtain two silicon rod blanks.

The half-slitting method further includes a wire-withdrawal process including:
step S9: gripping, by the gripper, the closest silicon rod blank;
step S10: separating the movable end of the auxiliary tensioner and the first jacking head from the top surface of the silicon rod;
step S11: making the silicon rod blank clamped by the clamper be away from the other silicon rod blank, so that a wire-withdrawal space is formed between the two silicon rod blanks;
step S12: making the movable end of the auxiliary tensioner and the first jacking head abut against the top surface of the silicon rod, and releasing, by the gripper, the silicon rod blank;

step S13: moving the cutting end of the cutting assembly from the bottom of the wire-withdrawal space to the top of the wire-withdrawal space until the cutting end of the cutting assembly is entirely above the top of the silicon rod blank;

step S14: separating the first jacking head from the top surface of the silicon rod;

step S15: making the cutting end of the cutting assembly enter between the auxiliary tensioner and the first jacking head from below the first jacking head;

step S16: abutting the first jacking head against the top surface of the silicon rod;

step S17: separating the movable end of the auxiliary tensioner from the top surface of the silicon rod;

step S18: making the cutting end of the cutting assembly exit the clamping space from below the movable end of the auxiliary tensioner; and step S19: abutting the movable end of the auxiliary tensioner against the top surface of the silicon rod.

The above description is only an embodiment of the present application, and is not intended to limit the scope of the present application, and all equivalent modifications made by the present application and the contents of the accompanying drawings, which are directly or indirectly applied to the related technical fields, are included in the scope of the present application.

What is claimed is:

1. An upper jacking structure, comprising a first linear reciprocating device, an upper jacking block, and an auxiliary tensioner, wherein a movable end of the first linear reciprocating device moves in a vertical direction, and the upper jacking block is provided on the movable end of the first linear reciprocating device;

the upper jacking block has a first jacking surface symmetrically provided with a first jacking head and a second jacking head at either side of a center line of the first jacking surface, and the first jacking head and the second jacking head are slidingly provided on the first jacking surface in a vertical direction; and the auxiliary tensioner is located on a side of the upper jacking block adjacent to the first jack, and the auxiliary tensioner has a movable end moving in a vertical direction;

elastic members respectively connected to the first jacking head and the second jacking head are provided in the upper jacking block, and the upper jacking block has a fully-compressed state, a semi-compressed state, and a non-compressed state;

when the upper jacking block is in a fully-compressed state, the first jacking head and second jacking head respectively compress the correspondingly connected elastic member and abut against the top surface of the silicon rod;

when the upper jacking block is in a semi-compressed state, the first jacking head does not compress the correspondingly connected elastic member, the second jacking head compresses the correspondingly connected elastic member, and the second jacking head abuts against the top surface of the silicon rod; and when the upper jacking block is in a non-compressed state, neither the first jacking head nor the second jacking head compresses the correspondingly connected elastic member and is separated from the top surface of the silicon rod.

2. The upper jacking structure according to claim 1, wherein a third jacking head is slidingly provided on the first jacking surface in a vertical direction and is located on a center line of the first jacking surface, and an elastic member connected to the third jacking head is provided in the upper jacking block;

when the upper jacking block is in a fully-compressed state, the third jacking head compresses the correspondingly connected elastic member and abuts against the top surface of the silicon rod;

when the upper jacking block is in a semi-compressed state, the third jacking head compresses the correspondingly connected elastic member and abuts against the top surface of the silicon rod; and when the upper jacking block is in a non-compressed state, the third jacking head does not compress the correspondingly connected elastic member and is separated from the top surface of the silicon rod.

3. The upper jacking structure according to claim 2, wherein an end of the third jacking head remote from the upper jacking block is provided with a notch facing the first jacking head.

4. The upper jacking structure according to claim 2, further comprising a sensor, wherein an upper jacking structure further comprises a sensor having a detection end facing an end of the first upper jacking block away from the upper jacking block, or a second jacking head away from the upper jacking block, or a third top away from the upper jacking block.

5. The upper jacking structure according to claim 1, further comprising a plurality of edge skin jacking tensioners positioned at the sides of the upper jacking block and having movable ends moving in a vertical direction.

6. A half-slitting machine, comprising a lower jacking block, a cutting assembly, and an upper jacking structure, wherein the lower jacking block is below the upper jacking block, a clamping space is formed between the lower jacking block and the upper jacking block, and a cutting end of the cutting assembly is movable in a vertical direction and a horizontal direction into and out of the clamping space;

the upper jacking structure comprises a first linear reciprocating device, an upper jacking block, and an auxiliary tensioner, wherein a movable end of the first linear reciprocating device moves in a vertical direction, and the upper jacking block is provided on the movable end of the first linear reciprocating device;

the upper jacking block has a first jacking surface symmetrically provided with a first jacking head and a second jacking head at either side of a center line of the first jacking surface, and the first jacking head and the second jacking head are slidingly provided on the first jacking surface in a vertical direction;

the auxiliary tensioner is located on a side of the upper jacking block adjacent to the first jack, and the auxiliary tensioner has a movable end moving in a vertical direction;

elastic members respectively connected to the first jacking head and the second jacking head are provided in the upper jacking block, and the upper jacking block has a fully-compressed state, a semi-compressed state, and a non-compressed state;

when the upper jacking block is in a fully-compressed state, the first jacking head and second jacking head respectively compress the correspondingly connected elastic member and abut against the top surface of the silicon rod;

when the upper jacking block is in a semi-compressed state, the first jacking head does not compress the correspondingly connected elastic member, the second jacking head compresses the correspondingly connected elastic member, and the second jacking head abuts against the top surface of the silicon rod; and when the upper jacking block is in a non-compressed state, neither the first jacking head nor the second jacking head compresses the correspondingly connected elastic member and is separated from the top surface of the silicon rod.

7. The half-slitting machine according to claim 6, wherein the cutting assembly comprises a vertically provided first mounting plate movable in a vertical direction and a horizontal direction, the first mounting plate is provided with a through hole in a thickness direction, and a wire cutting train and a clamper respectively provided at both ends of the first mounting plate in a thickness direction; the cutting end of the wire cutting train encloses a clamping space on the mounting panel, and the holder comprises a clamper that can protrude into the clamping space through the through hole.

8. The half-slitting machine according to claim 7, wherein the clamper comprises a second linear reciprocating device having a movable end moving in parallel to the thickness direction of the first mounting plate, and at least a layer of the holder is provided on the movable end of the second linear reciprocating device in a direction parallel to the length direction of the first mounting plate.

9. The half-slitting machine according to claim 7, wherein the clamper comprises a second mounting plate provided on the movable end of the second linear reciprocating device and a wedge relatively slidably provided on the second mounting plate in a direction perpendicular to the moving direction of the movable end of the second linear reciprocating device, and the wedge having a gripping arm protrudes out of the plate surface of the second mounting plate.

10. The half-slitting machine according to claim 9, wherein the holder further comprises a push-pull block provided with a guide slot inclined toward the side of the second mounting plate, and a driving member provided with a guide post inserted into the guide slot of the wedge slidingly provided opposite to each other, the movable end of the driving member is connected to the push-pull block, and the moving direction of the movable end of the driving member is parallel to the moving direction of the movable end of the second linear reciprocating device.

11. The half-slitting machine according to claim 9, wherein the holder further comprises a guide rail provided on the plate surface of the second mounting plate, and the wedge is slidably provided on the guide rail.

12. The half-slitting machine according to claim 7, wherein the wire cutting train comprises a cutting line annularly provided in a wire groove of a driving wheel, a follower wheel, and a tensioning wheel which are provided on one end surface of the first mounting plate in a thickness direction.

13. The half-slitting machine according to claim 12, further comprising a tensioning mechanism comprising a bearing seat and a rotating shaft; wherein the bearing seat is provided on the first mounting plate, a rotating shaft is rotatably mounted in the bearing seat via a bearing, and one end of the rotating shaft remote from the bearing seat is eccentrically provided with a connecting arm connected to a tensioning wheel.

14. The half-slitting machine according to claim 7, further comprising a shield covering the through hole of the first mounting plate, wherein two opposite side edges of the shield are respectively a fixed edge and a free edge, the fixed edge of the shield is connected to the first mounting plate, and the direction from the fixed edge to the free edge of the shield is parallel to a length direction of the first mounting plate.

15. The half-slitting machine according to claim 6, wherein the lower jacking block has a second jacking surface, wherein the second jacking surface is provided with a fourth jacking head corresponding to the first jacking head, and the second jacking surface is provided with a fifth jacking head corresponding to the second jacking head.

16. The half-slitting machine according to claim 6, further comprising a plurality of edge skin jacking tensioners positioned at the sides of the lower jacking block and having movable ends moving in a vertical direction.

17. A half-slitting method, comprising:
providing a half-slitting machine comprising:
a lower jacking block, a cutting assembly, and an upper jacking structure, wherein the lower jacking block is below the upper jacking block, a clamping space is formed between the lower jacking block and the upper jacking block, and a cutting end of the cutting assembly is movable in a vertical direction and a horizontal direction into and out of the clamping space;
the cutting assembly comprises a vertically provided first mounting plate movable in a vertical direction and a horizontal direction, the first mounting plate is provided with a through hole in a thickness direction, and a wire cutting train and a clamper respectively provided at both ends of the first mounting plate in a thickness direction; the cutting end of the wire cutting train encloses a clamping space on the mounting panel, and the holder comprises a clamper that can protrude into the clamping space through the through hole;
the upper jacking structure comprises a first linear reciprocating device, an upper jacking block, and an auxiliary tensioner, wherein a movable end of the first linear reciprocating device moves in a vertical direction, and the upper jacking block is provided on the movable end of the first linear reciprocating device;
the upper jacking block has a first jacking surface symmetrically provided with a first jacking head and a second jacking head at either side of a center line of the first jacking surface, and the first jacking head and the second jacking head are slidingly provided on the first jacking surface in a vertical direction;
the auxiliary tensioner is located on a side of the upper jacking block adjacent to the first jack, and the auxiliary tensioner has a movable end moving in a vertical direction;
elastic members respectively connected to the first jacking head and the second jacking head are provided in the upper jacking block, and the upper jacking block has a fully-compressed state, a semi-compressed state, and a non-compressed state;
when the upper jacking block is in a fully-compressed state, the first jacking head and second jacking head respectively compress the correspondingly connected elastic member and abut against the top surface of the silicon rod;
when the upper jacking block is in a semi-compressed state, the first jacking head does not compress the correspondingly connected elastic member, the second jacking head compresses the correspondingly connected elastic member, and the second jacking head abuts against the top surface of the silicon rod; and when the upper jacking block is in a non-compressed state, neither the first jacking head nor the second jacking head compresses the correspondingly connected elastic member and is separated from the top surface of the silicon rod;

performing a cutting-feed process comprising:

step S1: feeding a silicon rod into the clamping space, wherein a second jacking head of an upper jacking block abuts against the top surface of the silicon rod, and a movable end of a first jacking head and/or an auxiliary tensioner abuts against the top surface of the silicon rod, and the jacking head of a lower jacking block abuts against the bottom surface of the silicon rod;

step S2-1: in a case of the first jacking head and the auxiliary tensioner, if both the first jacking head and the movable end of the auxiliary tensioner abut against the top surface of the silicon rod, and the movable end of the auxiliary tensioner is separated from the top surface of the silicon rod in step S1, performing step S3;

step S2-2: wherein step S3 is performed if the first jacking head abuts against the top surface of the silicon rod, and the movable end of the auxiliary tensioner maintains a distance from the top surface of the silicon rod in step S1;

step S2-3: the first jacking head first abuts against the top surface of the silicon rod, and then the movable end of the auxiliary tensioner is separated from the top surface of the silicon rod, and then step S3 is performed if the first jacking head maintains a distance from the top surface of the silicon rod, and the movable end of the auxiliary tensioner abuts against the top surface of the silicon rod in step S1;

step S3: making a cutting end of the cutting assembly enter between the auxiliary tensioner and the first jacking head from below the movable end of the auxiliary tensioner;

step S4: abutting the movable end of the auxiliary tensioner against the top surface of the silicon rod;

step S5: separating the first jacking head from the top surface of the silicon rod;

step S6: making the cutting end of the cutting assembly enter between the first jacking head and the second jacking head from below the first jacking head; and step S7: making the movable end of the first jacking head and/or the auxiliary tensioner abut against the top surface of the silicon rod; and performing a half-slitting process comprising step S8: cutting, by the cutting end of the cutting assembly, from the top end of the silicon rod to the bottom end of the silicon rod until the silicon rod is cut to obtain two silicon rod blanks.

18. The half-slitting method according to claim 17, further comprising a wire-withdrawal process comprising:

step S9: gripping, by the gripper, the closest silicon rod blank;

step S10: separating the movable end of the auxiliary tensioner and/or the first jacking head from the top surface of the silicon rod;

step S11: making the silicon rod blank clamped by the clamper be away from the other silicon rod blank, so that a wire-withdrawal space is formed between the two silicon rod blanks;

step S12: making the movable end of the auxiliary tensioner and/or the first jacking head abut against the top surface of the silicon rod, and releasing, by the gripper, the silicon rod blank; and step S13: moving the cutting end of the cutting assembly from the bottom of the wire-withdrawal space to the top of the wire-withdrawal space until the cutting end of the cutting assembly is entirely above the top of the silicon rod blank.

19. The half-slitting method according to claim 18, wherein the wire-withdrawal process further comprises:

step S14: abutting the movable end of the auxiliary tensioner against the top surface of the silicon rod;

step S15: making the cutting end of the cutting assembly enter between the auxiliary tensioner and the first jacking head from below the first jacking head;

step S16: abutting the first jacking head against the top surface of the silicon rod;

step S17: separating the movable end of the auxiliary tensioner from the top surface of the silicon rod; and step S18: making the cutting end of the cutting assembly exit the clamping space from below the movable end of the auxiliary tensioner.

* * * * *